Jan. 8, 1963  M. KLUDAS ET AL  3,072,528
INGESTIBLE DRY MICROORGANISM PREPARATIONS
Filed July 14, 1958
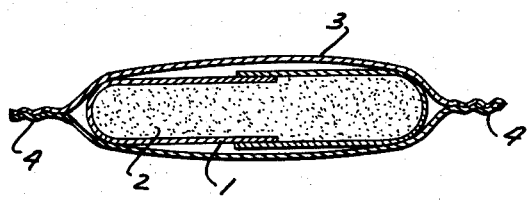
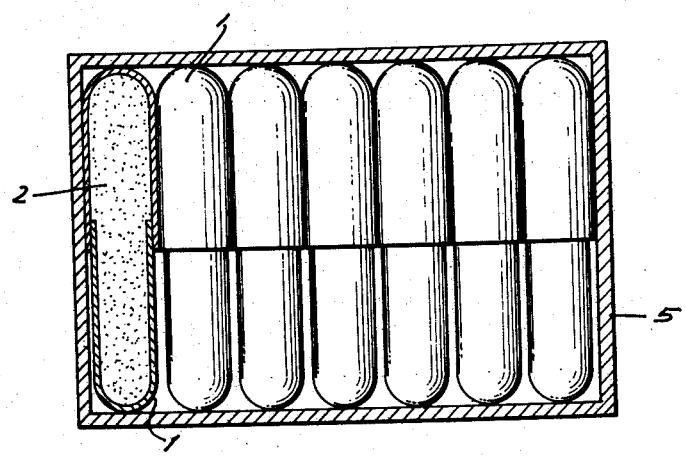
INVENTORS
Martin Kludas and
Werner Schiefendecker
BY Michael S. Striker
Attorney

---

3,072,528
INGESTIBLE DRY MICROORGANISM PREPARATIONS
Martin Kludas, Berlin-Charlottenburg, and Werner Schieferdecker, Berlin-Schmargendorf, Germany, assignors to Med. Fabrik Chemisch-Pharmazeutischer Praeparate J. Carl Pflüger, Berlin-Halensee, Germany
Filed July 14, 1958, Ser. No. 748,214
Claims priority, application Germany July 13, 1957
7 Claims. (Cl. 167—55)

The present invention relates to ingestible dry microorganism preparations and more particularly to dry preparations of living microorganisms such as the bacteria of the normal intestinal flora, and to methods of manufacturing such preparations so that the same remain stable over prolonged periods of time.

Scientific investigations of symbiosis have shown that an intestinal flora is demonstrably necessary for survival of lower animals, and that the symbionts are not made superfluous by compensating nutrition. Symbionts and microorganisms are inseparably connected during the entire life span and the symbionts furnish growth substances which are absolutely necessary for normal development. The significance of symbionts to animals could be proved experimentally. According to De Somer a new flora developing after antibiotic treatment caused physico-chemical changes of the intestinal contents. The pH value, for example, which normally is in the acid range, was raised to 7.8–8.5. Reports on experiments performed with animals raised under sterile conditions have shown that these animals do not possess a fully developed system of intestinal lymph vessels, their leukocytes are not capable of phagocytosis, and no antibodies are detectable in their blood serum so that there is no defensive system present.

Whether the vital necessity of the intestinal flora which was established for the animal world is also of significance to man, was not known. It was only with the introduction of antibiotics therapy that it became possible to study experimentally the significance of the physiologically normal intestinal symbionts as the intestinal flora was destroyed by the antibiotics. Detrimental side effects after use of antibiotics have been increasingly reported in recent years and have furnished adequate evidence that the destruction of a physiologically normal intestinal flora can lead to abnormal conditions of great severity. When it became known that the antibiotics not only kill pathogenic bacteria but also microorganisms which are part of the normal human physiology, scientists started investigating the question of the necessity of the intestinal flora in humans.

When ingestion of antibiotics was followed by symptoms of vitamin B deficiency accompanied by degeneration of the coli flora, such vitamin deficiencies could be eliminated only by implantation of coli bacilli having properly functioning metabolic systems. The same vitamin deficiency, however, could not be removed solely by supplying the vitamin. It has been found that the implantation of intestinal microorganisms and particularly of Lactobacillus and L. bifidus is frequently beneficial. Some investigators have succeeded in substantially reducing the large number of dyspepsias observed after institutional antibiotic therapy by treatment aiming at substituting the destroyed coli bacilli.

A rise in hemoglobin level after oral ingestion of E. coli in iron-deficiency anemias has been reported and it has been pointed out that an abnormal bacterial flora which may be the responsible focus for disseminated toxic symptoms may frequently be overlooked in typical diseases of old age such as arthroses. In such cases it is recommended to implant a new non-pathogenic flora of physiologically active bacteria. The use of *acidophilus* and of *E. coli* after extended antibiotic treatment has been recommended but it has also been emphasized that *E. coli* established in the stomach or in the duodenum constitutes an additional focus of disease. Some investigators consider oral application of liquid coli cultures dangerous inasmuch as large portions of the ingested germs are destroyed by the hydrochloric acid of the gastric juices (pH 1.2–1.7) and therefore ingestion of living bacteria in capsules soluble in the intestinal fluid has been recommended.

The physiologically normal intestinal flora of humans is composed primarily of three symbionts: *Lactobacillus acidophilus*, *Lactobacillus bifidus* and *Escherichia coli*. Until now, these three microorganisms were therapeutically employed in separate doses since simultaneous use of the three germs was not possible for technical reasons unless a very complicated method was employed, namely of having three types of bacteria in a single preparation, which was not practically possible under the conditions of manufacture of a therapeutic preparation under industrial conditions.

The method of ingestion is of decisive importance in any bacterial substitution therapy. It has been found that bacteria given by mouth, for example, in liquid-suspended form, in tablets, in granules, or as powders, are already attacked by hydrochloric acid in the gastric juices and that the bacteria may from the stomach reach parts of the body where they may have pathogenic effects, such as *E. coli* in the gall bladder. It has been reported that of seventy patients who received *E. coli* by mouth in the form of the liquid culture, ten developed infections of the bile ducts. Such side effects may be avoided by employing capsules which resist gastric juices and dissolve in the intestinal fluid. It has been found, however, that bacteria filled into capsules by conventional methods lose their vital functions after a short storage time. This is due primarily to the fact that moisture is generally harmful. This not only holds for the usual bacteria preparations in paste form. Even the dry bacterial preparations produced according to several known methods in the form of powders or as granules soon lose their efficiency when filled into capsules since even the small amount of moisture contained in the capsule material and the atmospheric moisture penetrating through the capsules are detrimental to the survival rate of the bacteria. The bacterial titer of such capsules which were not treated by the method of the present invention dropped from one billion to 0 within a matter of days when stored at room temperature, and within a few weeks when stored under refrigeration at 4° C. Accordingly such preparations are not commercially suitable since it is not possible to keep preparations alive during the commercially required periods of up to one year or longer, whether the preparation be stored under refrigeration or at room temperature.

It is known to store microorganisms which were grown in liquid or on solid nutrient media under suitable conditions of growth, which were then separated from the media by centrifugation, filtration, or recantation, and which were finally lyophilized, in the form of a dry powder under vacuum or in a sealed glass vial filled with nitrogen. Depending on the method of preparation, the ratio of surviving organisms still drops more or less rapidly. Such lyophilisates are not only used therapeutically as such, but they also serve for the production of fresh cultures. For this purpose the contents of the vial are added to a nutrient bouillon. A fresh bacterial culture is thus obtained and has to be taken by the patient. Bacterial cultures in such an ingestible form are objectionable from an esthetic point of view and provoke the patient's disgust since the liquid acquires an evil smell after a very short time. Furthermore, they have the disadvantage of being free in the stomach when they can be attacked by acids and from which they can travel to undesired locations.

In order to employ several types of bacteria simultaneously as required in intestinal therapy, it would be necessary to inoculate a plurality of as many different culture fluids as there are types of bacteria which are to be applied in the intended therapeutic process. This would make it necessary to obtain each species of bacteria individually in dry form and to store it in an individual vial which is then used in the above-described manner for the preparing fresh cultures from dry bacterial preparasible to cultivate a plurality of different dry bacterial preparations simultaneously in the same nutrient medium because the several species would mutually interfere in their development or may require specific different nutrient substrates. Aside from the inconvenience of first preparation fresh cultures from dry bacterial preparations, this form of ingestion is objectionable primarily because fresh liquid bacterial cultures have to pass through the stomach and the duodenum and may be partially killed there by the hydrochloric acid in the gastric juices, or they may have harmful side effects.

It is accordingly a primary object of the present invention to provide for the production of living microorganism preparations, or at least preparations which have the capability of again living, and which can remain stable over prolonged periods of time, can be taken after such long period of time and in the body can become alive and have the desired effect.

It is another object of the present invention to provide living microorganism preparations in capsules which are soluble in the intestine so that upon ingestion of the capsules the same do not become dissolved until they reach the intestine and the bacteria are not freed for action until they reach the intestine. This avoids the disadvantage of microorganism becoming freed or free in the stomach whereby can be attacked by acid, and also from where they can pass to undesired locations such as the gall bladder.

It is still another object of the present invention to provide a method of preparing ingestible dry microorganism preparations in intestinally soluble capsules.

Other objects and advantages of the present invention will be apparent from a further reading of the specification and of the appended claims.

With the above objects in view, the present invention mainly comprises a storable live microorganism preparation which can be directly ingested and freed in the intestine of the person ingesting the same, comprising a dry enteric capsule containing dry, lyophilized living microorganisms of the intestinal flora, and a sealed moisture-proof container enclosing the capsule.

The arrangement for storing living microorganisms in accordance with the present invention mainly comprises a dry enteric capsule containing dry, lyophilized living microorganisms, and a sealed moisture-proof container enclosing the capsule. This arrangement is illustrated in the accompanying drawings in which:

FIG. 1 illustrates an arrangement for a single capsule, and

FIG. 2 illustrates an arrangement for a plurality of capsules.

As shown in FIG. 1 a dry enteric capsule 1, for example of specially treated gelatin, containing dry, lyophilized living microorganisms 2 is enclosed in a moisture-proof container 3 which, for example may be made of aluminum foil or the like, and the ends of which 4 are sealed.

As illustrated in FIG. 2 a plurality of enteric capsules 1 containing microorganism preparations 2 are enclosed in a container 5, for example a tin box or the like.

In accordance with the present invention it is possible to avoid the disadvantage of bacterial preparations in enteric capsules, that is capsules that are specially treated so as to pass through the stomach and be dissolved in the intestinal juices, whereby the killing off of the bacteria in the capsule is to a great extent avoided so that the capsules can be stored for prolonged periods of time, for example 18 months or more, and used when desired without any substantial loss of the original action.

In accordance with the present invention it is preferred to utilize as the microorganism the microorganisms of the intestinal flora, for example *Lactobacillus acidophilus*, *Lactobacillus bifidus*, or *Escherichia coli*. Furthermore in accordance with the present invention it is possible to utilize not only one type of microorganism, but a plurality, and even all three of these different types of microorganisms.

It is further preferred in accordance with the present invention to include along with the dry lyophilized living microorganisms a non-toxic water absorbing substance such as lactose anhydride, silica gel, activated carbon, aluminum oxide, aluminum hydroxide, cellulose, tylose, magnesium carbonate, magnesium hydroxide, magnesium oxide, magnesium trisilicate, alkaline earth metal carbonates, oxides and hydroxides, kieselguhr, bentonite and barite.

It is still further preferred in accordance with the present invention to include along with the dry lyophilized living microorganisms a dry substance which is adapted in the presence of moisture, i.e. in the intestinal fluid after the capsule becomes dissolved, to act as a nutrient for the microorganisms, for example, lactose, dextrose, powdered skimmed milk, ascorbic acid, tylose, liver extract, yeast extract, powdered placenta, and the like. The capsules which are utilized for the purposes of the present invention may be any enteric capsules, that is capsules which pass through the stomach and become dissolved in the intestine. For example, specially treated gelatin capsules are particularly suitable. The capsule itself is predried prior to being filled with the microorganisms, preferably to a water content of 1% by weight or less. The microorganisms which are dried are preferably dried to a water content of between 0.1 to 1% by weight, and most preferably to a water content of about 0.5% by weight.

In order to protect the microorganisms in the gelatin capsules from coming in contact with excessive moisture during prolonged storage, which would cause the microorganisms to grow in number in the capsule and subsequently to kill themselves off, the capsule containing the microorganism should be placed in a moisture-proof container, for example an evacuated, sealed metal foil container. The capsules may be enclosed individually or in number in a container.

The bacterial powder, that is the dry lyophilized microorganism preparation may be prepared as follows:

A sterilized nutrient solution, for example 1% glucose bouillon, is inoculated with *Lactobacillus acidophilus* and is incubated at 37° C. for 48 hours. The liquid is then centrifuged and the moist mass of bacteria is provided in known manner with preservatives and is lyophilized. It has been found that the kind and amount of preservatives added can help to keep the bacillus alive over prolonged periods of time. Thus, for example, utilizing 2 g. of lactose, 2 g. of skimmed milk powder and 40 g. of ascorbic acid to 3 g. of moist centrifuged bacterial substance, an initial titer of two billion will result in a survival of thirteen million germs after one year's storage at room temperature.

The bacterial substance is made into a powder by freeze-drying and is mixed under exclusion of air and moisture (by working in a dry atmosphere of nitrogen or carbon dioxide) with moisture absorbing substances such as lactose anhydride, silica gel, or the like, and is filled into capsules which are soluble in the intestinal fluid and which capsules have first been predried, for example over phosphorous pentoxide. After additional drying, the filled capsules are transferred to preferably evacuated storage containers.

Experiments have shown that lyophilized bacteria which were filled into sufficiently predried gelatin capsules, that is capsules which still contain water, remain alive only for a very short period of time and that it is a necessary prerequisite for a sufficiently high rate of survival that moisture be removed to a very great extent not only from the bacteria, but also from the capsules.

In a comparative experiment, small, undried gelatin rings were slipped over some of a number of predried gelatin capsules containing lyophilized bacteria. After six months to a year storage it was found that several million of living bacteria could be detected only in those capsules which were completely dried and which had not been equipped with undried gelatin rings.

It is a particular advantage of the present invention that it makes it possible to mix several types of bacteria in powder form and to maintain them simultaneously alive in a single capsule soluble in intestinal fluid, i.e. an enteric capsule, since they do not interfere with each other in the dry condition in which they are stored. It is possible, for example, to preserve several types of bacteria, for example *Lactobacillus acidophilus*, *Lactobacillus bifidus*, and *Escherichia coli* in a single capsule and to show the presence of all three types of bacteria on a nutrient blade after storage of the capsule for one year or more. This shows that different bacteria will remain alive together in the above described powder form without damage, in an amount necessary for therapeutic effect over an adequate span of time.

It has been found that suitable preservatives for the present invention to prevent the indiivdual cells of the microorganisms from being damaged or crushed during freezing which causes formation of ice crystals and which would otherwise crush the microorganisms include, as mentioned above, lactose, tylose, ascorbic acid, placenta powder, liver extract and yeast extract. When the bacteria which were kept alive but whose metabolism had been stopped so that they were, after a fashion, mummified, reached the intestinal tract, these preservatives create in the intestine favorable physiological conditions for the bacteria which cause the bacteria to resume metabolism and to multiply in the moisture and warmth prevailing in the intestine. It is also preferred to add to the otherwise finished dry preparation dry nutrient additives so that the bacteria when again provided with moisture in the intestinal canal immediately find substances which enhance their development. As mentioned above, dry milk powder or the like may be used for this purpose.

Filling of the capsules may further be facilitated in ready dispersion of the preparations in the intestine may be achieved by making a paste from the powdery lyophilisates with anhydrous liquids such as paraffin oil, and by filling the resulting paste into capsules. Experiments have shown that lyophilized bacteria mixed with paraffin oil had a survival rate after one year of storage of 65 millions of coli bacilli and 10 millions of *Lactobacillus acidophilus* per capsule.

It is particularly advantageous to store the filled capsules in such a manner that several filled capsules are sealed between two foils impervious to air and moisture which are welded together along their projecting edges, a vacuum preferably being formed in the storage space between the foils. Storing capsules containing living bacteria in glass vials is always disadvantageous since the vials may splinter during opening so that glass splinters may be ingested together with the capsule.

A normal unit dose of the bacteria per patient would be about 2 billion of the various types of bacteria. Of course this amount may vary greatly depending upon the individual patient, the individual need, and the type of bacteria. The capsules of the present invention may contain practically any amount of bacteria, for example from one half million to two billion or even more. The greater the number of bacteria per capsule the less the number of capsules that have to be taken.

The amount of protective substances which is mixed with the microorganisms prior to freeze-drying thereof may vary depending upon the substance. The following table will indicate preferred amounts, the amounts indicated in the table being with respect to 30 g. of centrifuged wet bacteria mass:

*Table*

|  | Maximum, g. | Minimum, g. | Optimum, g. |
| --- | --- | --- | --- |
| Lactose | 30 | 1 | 5 |
| Dextrose | 30 | 1 | 5 |
| Powdered skimmed milk | 30 | 5 | 10 |
| Ascorbic Acid | 0.75 | 0.075 | 0.4 |
| Tylose | 0.75 | 0.075 | 0.4 |
| Liver Extract | 5 | 0.25 | 1.5 |
| Yeast extract | 5 | 0.25 | 1.5 |
| Placenta powder | 10 | 1 | 7 |
| Pure paraffin oil | 30 | 1 | 5 |

The amount of the moisture absorbing substances mixed with the lyophilisates may also vary depending upon the type of substance and the bacteria. Thus, for example, silica gel which is added to the lyophilisate may be used in an amount of 1 to 60 g., most preferably 15 g. per each 30 g. of moist bacteria mass, while substances such as lactose anhydride, aerosol, activated carbon, aluminum oxide, aluminum hydroxide, cellulose, tylose, or other cellulose derivatives, magnesium carbonate, magnesium oxide, magnesium hydroxide, magnesium trisilicate, alkaline earth metal carbonates, oxides and hydroxides, kieselguhr, barite and bentonite may be used in the same amounts. Lactose anhydride is preferably used in an amount of 5 to 30 g., most preferably 10 g. per each 30 g. of moist bacteria mass.

The following examples are given to further illustrate the present invention. The scope of the invention is not, however, meant to be limited to the specific details of the examples:

EXAMPLE 1

24 liters of mash bouillon are inoculated with *Lactobacillus acidophilus*, are incubated 24 hours at 37° C. and are then centrifuged. 30 g. of a moist bacterial substance are obtained which contains about 5 g. of dry bacteria and 25 g. of water. 10 g. skim milk powder, 5 g. lactose, and 0.5 g. tylose are added to the moist substance and are mixed thoroughly. The mixture is lyophilized in known manner (by freeze-drying in a vacuum), and about 20 g. of a lyophilisate are obtained which has a net moisture content of less than 0.5%. This lyophilisate is mixed under exclusion of air and moisture (by working in an atmosphere of dry nitrogen or carbon dioxide) with 10 g. silica gel which absorbs the aforementioned residual moisture. The mixture is filled into gelatine capsules under exclusion of air and moisture. The capsules are of standard size No. 4 and have an internal diameter of 4.6 mm., an external diameter of 5.0 mm. and a length of 14.5 mm. Such gelatine capsules, when in equilibrium with normal room atmosphere have a moisture content of 12–16% and are therefore not suitable as enclosure of the dry mixture without further preparation. The gelatine capsules are therefore predried in a vacuum desiccator over phosphorous pentoxide until they have only a residual moisture content of about 1%. Taking into account certain unavoidable material losses during filling of the mixture into capsules, about 500 capsules of 0.06 g. each may be obtained from the above mixture. The filled capsules are subjected to supplemental drying (in a vacuum desiccator over $P_2O_5$).

The capsules are stored either in tightly closed glass containers (with ground glass stoppers) which are evacuated or filled with dry nitrogen, or several capsules are sealed between two foils impervious to air and moisture, the projecting edges of the foils being welded together in known manner.

EXAMPLE 2

10 liters meat bouillon are inoculated with *Escherichia coli*, are incubated 24 hours at 37° C. and are then centrifuged. About 30 g. of a moist bacterial substance are obtained and are mixed with 20 g. dextrose, 20 g. skim milk powder, 1.5 g. liver extract and 0.4 g. ascorbic acid. The mixture obtained is then lyophilized. The resulting lyophilisate is mixed with 40 g. lactose anhydride and the mixture is filled and stored as described in Example 1.

EXAMPLE 3

Equal or approximately equal amounts of the dry preparations obtained by the processes of Examples 1 and 2 are mixed and simultaneously a third dry preparation is added which was obtained in an analogous manner from *Lactobacillus bifidus*. The total mixture is filled into capsules and stored as indicated in Example 1.

Without further analysis, the foregoing will so fully reveal the gist of the present invention that others can by applying current knowledge readily adapt it for the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A storable live microorganism preparation which can be directly ingested and freed in the intestine of the person ingesting the same, comprising a dry enteric capsule adapted to be dissolved in the intestine and free the contents thereof and having a maximum water content of 1% by weight and containing dry, lyophilized living microorganisms of the intestinal flora, said dry, lyophilized living microorganisms having a maximum moisture content of 1% by weight; and a sealed moisture-proof container enclosing said capsule.

2. A storable live microorganism preparation which can be directly ingested and freed in the intestine of the person ingesting the same, comprising a dry enteric capsule adapted to be dissolved in the intestine and free the contents thereof and having a maximum water content of 1% by weight and containing a plurality of different dry, lyophilized living microorganisms of the intestinal flora selected from the group consisting of *Lactobacillus acidophilus, Lactobacillus bifidus* and *Escherichia coli*, said dry, lyophilized living microorganisms having a maximum moisture content of 1% by weight; and a sealed moisture-proof container enclosing said capsule.

3. A storable live microorganism preparation which can be directly ingested and freed in the intestine of the person ingesting the same, comprising a dry enteric capsule adapted to be dissolved in the intestine and free the contents thereof and having a maximum water content of 1% by weight and containing dry, lyophilized living microorganisms of the intestinal flora and at least one dry substance adapted in the presence of moisture to act as a nutrient for said microorganisms, said dry, lyophilized living microorganisms having a maximum moisture content of 1% by weight; and a sealed moisture-proof container enclosing said capsule.

4. A storable live microorganism preparation which can be directly ingested and freed in the intestine of the person ingesting the same, comprising a dry enteric capsule adapted to be dissolved in the intestine and free the contents thereof and having a maximum water content of 1% by weight and containing dry, lyophilized living microorganisms of the intestinal flora and at least one dry substance adapted in the presence of moisture to act as a nutrient for said microorganisms and being selected from the group consisting of lactose, dextrose, powdered skimmed milk, ascorbic acid, tylose, liver extract, yeast extract, and powdered placenta said dry, lyophilized living microorganisms having a maximum moisture content of 1% by weight; and a sealed moisture-proof container enclosing said capsule.

5. A method of preparing a storable live microorganism preparation which can be directly ingested and in which the microorganisms are freed in the intestine of the person ingesting the same, comprising the steps of introducing dry, lyophilized living microorganisms of the intestinal flora having a moisture content of 0.1 to 1% by weight and at least one non-toxic water absorbing substance and at least one dry substance adapted in the presence of moisture to act as a nutrient for said microorganisms into a dry enteric capsule adapted to be dissolved in the intestine and having a maximum moisture content of 1% by weight under vacuum in the presence of phosphorus pentoxide while excluding atmospheric moisture; further drying said capsule containing said microorganisms; and enclosing said dry enteric capsule containing said microorganisms in a moisture-proof container.

6. A storable live microorganism preparation which can be directly ingested and freed in the intestine of the person ingesting the same, comprising a dry enteric gelatine capsule adapted to be dissolved in the intestine and having a maximum moisture content of 1% by weight and containing dry, lyophilized living microorganisms of the intestinal flora having a moisture content of 0.1 to 1% by weight and being selected from the group consisting of *Lactobacillus acidophilus, Lactobacillus bifidus* and *Escherichia coli*, and at least one dry substance adapted in the presence of moisture to act as a nutrient for said microorganisms and being selected from the group consisting of lactose, dextrose, powdered skimmed milk, ascorbic acid, tylose, liver extract, yeast extract, placenta powder, and at least one non-toxic water absorbing substance being selected from the group consisting of lactose anhydride, silica gel, activated carbon, aluminum oxide, aluminum hydroxide, cellulose, tylose, magnesium carbonate, magnesium hydroxide, magnesium oxide, magnesium trisilicate, alkaline earth metal carbonates, oxides and hydroxides, kieselguhr, barite and bentonite; and a sealed moisture proof container enclosing said capsule.

7. A method of preparing a storable live microorganism preparation which can be directly ingested and in which the microorganisms are freed in the intestine of the person ingesting the same, comprising the steps of introducing dry, lyophilized living microorganisms of the intestinal flora and being selected from the group consisting of *Lactobacillus acidophilus, Lactobacillus bifidus* and *Escherichia coli* and having a moisture content of 0.1 to 1% by weight along with at least one non-toxic water absorbing substance being selected from the group consisting of lactose anhydride, silica gel, activated carbon, aluminum oxide, aluminum hydroxide, cellulose, tylose, magnesium carbonate, magnesium hydroxide, magnesium oxide, magnesium trisilicate, alkaline earth metal carbonates, oxides and hydroxides, kieselguhr, barite and bentonite and also along with at least one dry substance adapted in the presence of moisture to act as a nutrient for said microorganisms and being selected from the group consisting of lactose, dextrose, powdered skimmed milk, ascorbic acid, tylose, liver extract, yeast extract and placenta powder into a dry enteric capsule adapted to be dissolved in the intestine and having a maximum moisture content of 1% by weight under vacuum in the presence of phosphorus pentoxide while excluding atmospheric moisture; further drying said capsule containing said microorganisms; and enclosing said dry enteric capsule containing said microorganisms in a moisture-proof container.

References Cited in the file of this patent

UNITED STATES PATENTS

| | | |
|---|---|---|
| 427,553 | Cameron | May 13, 1890 |
| 1,263,940 | Schiefflin | Apr. 13, 1918 |
| 1,861,121 | Kapsenberg | May 31, 1932 |

(Other references on following page)

UNITED STATES PATENTS

| | | |
|---|---|---|
| 2,119,739 | Farr | June 7, 1938 |
| 2,560,830 | Turner | July 17, 1951 |
| 2,700,611 | Jeffreys | Jan. 25, 1955 |
| 2,760,630 | Lakso | Aug. 28, 1956 |
| 2,813,623 | Colovos | Nov. 19, 1957 |
| 2,946,724 | Valentine | July 26, 1960 |

FOREIGN PATENTS

| | | |
|---|---|---|
| 4,546 | Great Britain | 1909 |

OTHER REFERENCES

Hutton et al.: J. of Bacteriology 61, 1951, p. 317.
Bull: J.A.C.S. 66, 1944, pp. 1500–1505.